|   | United States Patent [19] | [11] | Patent Number: | 4,836,950 |
|---|---|---|---|---|
|   | Madsen et al. | [45] | Date of Patent: | Jun. 6, 1989 |

[54] LIQUID FOR REMOVING PRINTING AND SCREEN PRINTING INKS: BUTYROLACTONE AND/OR N-METHYL-2-PYRROLIDONE AND PROPYLENE GLYCOL DERIVATIVE

[75] Inventors: Claus H. Madsen, Vedbæk; Charles M. Hansen, Hørsholm, both of Denmark

[73] Assignee: CPS KEMI ApS, Denmark

[21] Appl. No.: 916,494

[22] PCT Filed: Dec. 13, 1985

[86] PCT No.: PCT/DK85/00119

§ 371 Date: Sep. 18, 1986

§ 102(e) Date: Sep. 18, 1986

[87] PCT Pub. No.: WO86/03766

PCT Pub. Date: Jul. 3, 1986

[30] Foreign Application Priority Data

Dec. 14, 1984 [DK] Denmark .............................. 6004/84

[51] Int. Cl.$^4$ .............................................. C09D 9/00
[52] U.S. Cl. ........................................ 252/153; 252/170; 252/171; 252/542; 252/DIG. 8
[58] Field of Search ............... 252/170, 171, 542, 153, 252/DIG. 8

[56] References Cited

U.S. PATENT DOCUMENTS

| 2,438,038 | 3/1948 | Craver | 134/38 |
|---|---|---|---|
| 3,673,099 | 6/1972 | Corby et al. | 252/156 |
| 4,276,186 | 6/1981 | Bakos et al. | 252/158 |
| 4,664,721 | 5/1987 | Valasek | 252/542 |

FOREIGN PATENT DOCUMENTS

| 0081355 | of 0000 | European Pat. Off. |
|---|---|---|
| 1586471 | 3/1981 | United Kingdom . |
| 1586472 | 3/1981 | United Kingdom . |

OTHER PUBLICATIONS

Paint & Resin, vol. 53(5), Oct. 1983, J. E. Hamlin "New Propylene Glycol Ethers and Acetates", pp. 42, 46.
Encyclopedia of Chemical Technology, pp. 889–910.

*Primary Examiner*—A. Lionel Clingman
*Attorney, Agent, or Firm*—Finnegan, Henderson, Farabow, Garrett & Dunner

[57] ABSTRACT

A liquid for removing printing and screen printing inks comprising an essentially anhydrous mixture containing:
(a) q-butyrolactone and/or N-methyl-2-pyrrolidone in an amount of 1–25% (v/v);
(b) one or more propylene glycol derivatives selected from substituted propyl acetates and/or propylene glycol ethers; and optionally
(c) a diluent selected from aliphatic compounds having a flash point above 22° C. and a content of aromatic compounds below 1%; and/or
(d) a surfactant, the amount of components (b), (c) and (d) constituting 99–75% (v/v) of the liquid.

13 Claims, No Drawings

LIQUID FOR REMOVING PRINTING AND SCREEN PRINTING INKS: BUTYROLACTONE AND/OR N-METHYL-2-PYRROLIDONE AND PROPYLENE GLYCOL DERIVATIVE

The present invention concerns a liquid for removing printing and screen printing inks, in particular for cleaning screen printing frames.

The liquid of the invention, which is useful in solving all types of cleaning problems in the printing and screen printing industry without the use of dangerous substances, is characterized by consisting of an essentially anhydrous mixture comprising (a) γ-butyrolactone of the formula

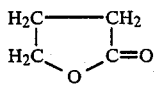

and/or N-methyl-2-pyrrolidone of the formula

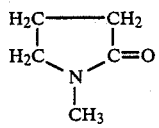

in an amount of 1–25%, preferably about 10% (v/v) as well as (b) one or more propylene glycol derivatives selected among substituted propyl acetates of the general formula

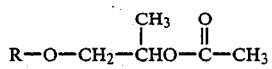

wherein R is hydrogen or alkyl having from 1 to 6 carbon atoms, and/or propylene glycol ethers of the general formula

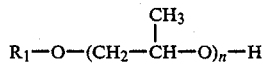

wherein $R_1$ is alkyl having from 1 to 6 carbon atoms, and n is 1, 2 or 3, and optionally (c) a diluent selected among aliphatic compounds having a flash point above 22° C. and a content of aromatic compounds below 1% and/or (d) a surfactant, the amount of components (b), (c) and (d) constituting 99–75% (v/v) of the liquid.

Dilution as well as universal cleaning or washing of printing and/or screen printing inks from stencils, printing plates, screen printing frames, rollers and the like was previously made by means of cleaning liquids, which either contain "dangerous substances", cf. e.g. the notice no. 147 issued by the Environmental Protection Agency on Mar. 16, 1981, or aromatic solvents the use of which involves considerable risk to the individuals working with these agents. In particular for the cleaning of old dried-up ink residues in offset and letterpress printing, mainly xylene- and toluene-based agents were used in the past, whose health effects are well-known. To this should be added that the known cleaning liquids frequently exhibit very low flash points, which partly entails that the liquids predominantly ignite easily, and partly may be an expression of a high volatility and thus increased potential health risk through aspiration of vapours. Thus, toluene has a flash point of only 5° C.

The currently leading cleaning liquid for washing screen printing frames is thus "Pregan 240E" from Kissel & Wolf, West Germany, which has the following composition:
Ethyl acetate: 10%
Isobutyl acetate: 32%
"Solvesso 100": 58%
and a flash point of 31° C.

"Solvesso 100" from Esso Chemicals contains 99% aromates.

It has long been known that the diluent liquids for ink formulations recommended by the ink manufacturers, are based on solvents which contain dangerous substances and therefore require utmost care.

As regards the cleaning process, the task is even more difficult. Here, dried-up inks are often to be dissolved in order for these to be removed from the printing and screen printing apparatus. Some inks are easy to remove, while others are extremely difficult to handle, and the ink types used are moreover different at the individual graphic firms. Some inks are extremely pernicious because they consist of two-component systems. Such inks may be difficult to remove within an ordinary working day, unless cleaning liquids of a type involving health dangers are used.

Consequently, it was necessary in the past to keep the above-mentioned dangerous and easily ignitable cleaning liquids, because only such liquids have been found to be able to dissolve all the ink types in use.

The screen printing industry faces particular problems because the cleaning liquids able to remove all inks also tend to destroy the glue which is used in the mounting of screens on screen printing frames. Further, it is not possible to select water-based or strongly hydrophilic cleaning liquids at will because such liquids will tend to destroy the stencil emulsion.

The use of γ-butyrolactone and/or N-methyl-2-pyrrolidone as a cleaning agent for printing inks is known. Thus, such use is described in the FR Patent Specification No. 2,354,377, but this specification deals with removal of the stencil itself and not the printing ink. An important property of a cleaning agent for removal of screen printing inks is that it does not remove or destroy the stencil. The cleaning agent according to the mentioned FR specification contains e.g. periodate ions which destroy stencils based on polyvinyl alcohol. The agent may moreover contain large amounts of water which will also be harmful to the stencil used.

A cleaning liquid predominantly consisting of N-methyl-2-pyrrolidone is mentioned in the EP Patent Specification 21149. However, this liquid primarily serves to dissolve polyurethane and epoxy lacquers, which it is intended to avoid with the cleaning liquid of the invention because the glue used for the mounting of screen printing frames is made on this basis.

The DE Offenlegungsschrift No. 3,401,982 concerns water-based printing inks with a pH of 9–11, which may contain solvents, such as N-methyl-2-pyrrolidone, to improve the solubility of the ink in the formulation. The cleaning liquids comprised by the invention, however, are not water-based, but are in contrast essentially anhydrous since, as mentioned, water in large amounts will degrade the stencils used in practice.

A lacquer remover based on γ-butyrolactone is known from the U.S. Patent Specification No. 2,438,038. This lacquer remover, however, is also water-based, and it moreover contains from 40 to 80% γ-butyrolactone or γ-valerolactone whereas the liquid of the invention does not contain substantial amounts of water and may have a maximum content of 25% γ-butyrolactone since, otherwise, it would decompose the glue. In other words, the cleaning liquid known from this U.S. specification cannot be used for cleaning screen printing frames while maintaining both the glue and the stencil.

The EP Application 81355 describes a process and an agent for cleaning printing screens. The agent of the EP application requires the use of N-methyl-2-pyrrolidone in amounts of 30-85%, which will cause decomposition of the polyurethane-based and epoxy-based glue types used in the screen printing for mounting of screens. Further, the agent of the mentioned EP application may contain cyclohexanone or halogenated compounds, which are termed dangerous substances and which are not included in the liquid of the invention.

As will appear from a following example, glue systems based on two-component epoxy or polyurethane will be decomposed and rendered useless, if the screen printing frames when being cleaned of inks are subjected to cleaning liquids whose formulations include more than 25% γ-butyrolactone or N-methyl-2-pyrrolidone.

The ability of a solvent to dissolve a given substance, e.g. a polymer, may conveniently be evaluated by parameter considerations according to the so-called "Hansen system", which is described in Encyclopedia of Chemical Technology, Suppl. vol. 2nd Ed., p. 889–910, John Wiley & Sons, New York, and by Charles M. Hansen in Färg Och Lack 17, 69–77 (1971). According to the "Hansen system", a solvent may be described by three solubility parameters $\delta_D$ (dispersion parameter), $\delta_P$ (polarity parameter) and $\delta_H$ (hydrogen bonding parameter), whose squares in combination are the square of the total cohesive energy:

$$\delta_{tot}^2 = \delta_D^2 + \delta_P^2 + \delta_H^2.$$

Two substances have a maximum interaction (i.e. are soluble in each other) when their solubility parameters in pairs are as close to each other as possible. A solvent may thus be characterized by a total parameter which may be divided into three sub-parameters, which may e.g. be illustrated in a three-dimensional system of co-ordinates with the sub-parameters as axes.

The solubility of polymers, e.g. such as are used as binders in printing inks, may accordingly be characterized on the basis of their interaction with different solvents, it having been found that all solvents capable of dissolving a specific binder are within a defined volume in the above-mentioned system of co-ordinates. If the scale on the $\delta_D$ axis is expanded by a factor of 2, the solubility range will be a ball. A polymer may thus be characterized by a centre ($\delta_D$, $\delta_P$, $\delta_H$) and a radius $R_P$.

Any solvent can be adapted to the three-dimensional system of co-ordinates for a given polymer on the basis of its three parameters. It is determined subjectively by solubility tests whether the individual solvent can dissolve the polymer or not, and the solubility range of this polymer is then determined by electronic data processing, the program iteratively determining a centre and a radius, so that the greatest possible number of active solvents is within the resulting ball, while the inactive agents are outside it.

It is described in the following examples 1 and 2 how possible solvents have been found by means of the "Hansen system" for two ordinary printing inks, "Thermojet Hvid" and "Drugloss Blå", which are considered to be some of the most difficult inks to remove from printing equipment. Examples 3-6 describe similar calculations for four additional ordinary printing inks which are difficult to remove.

However, it has been found by a methodical examination of commercially available screen printing and printing inks with a view to developing new cleaning and diluting liquids that Hansen's parameter theory, not even in case of equilibrium without regard to the time parameter, leads to unambiguous results. Possible explanations are i.a. that the inks may be complicated and contain several polymers, and that the parameter model is complicated by the use of mixtures of solvents. Moreover, in practice, it is necessary to consider the above-mentioned "time factor" because a solvent is not useful in practice, if it is active only after exposure for an extended period of time, even though it satisfies the Hansen model.

Accordingly, to obtain results which are useful in practice, it is necessary to use a modified Hansen model to find a solvent which in itself can dissolve the inks in question, but which—to obtain a reasonably high dissolution rate and suitable low costs—is included in a mixture of one or more other agents.

It has surprisingly been found that the cleaning liquid of the invention is capable of dissolving all printing and screen printing inks which are used in practice. The subject liquid mixtures consist of compounds, which each are used as solvents for a number of purposes, and which are characterized by suitably high flash points, just as they involve an appropriately small health risk in use, see e.g. Paint & Resin 53 (5), 42–47 (1983).

N-methyl-2-pyrrolidone and γ-butyrolactone are, as mentioned, solvents each of which or in mutual mixtures have been found to be capable of dissolving many, but not all ordinary printing and screen printing inks. Thus, e.g. γ-butyrolactone cannot dissolve Colorjet CO113 mandarinorange from Sericol (see example 3), and N-methyl-2-pyrrolidone cannot dissolve Seristar SX (see example 4). Therefore, it has been found necessary to add one or more substituted propyl acetates or propylene glycol ethers since this results in (a) solubility, (b) higher dissolution rates (i.e. improved time parameters) in several cases and (c) economically more advantageous cleaning liquids.

γ-Butyrolactone and/or N-methyl-2-pyrrolidone (a) is to be mixed with such substituted propyl acetates or propylene glycol ethers (b) within certain limits which are determined in view of such conditions as solubility, dissolution rate ("time parameter") and economy. The best results, also economically, are obtained when the mixture ratio of (a) to (b) is between 25:75 and 1:99 (v/v).

The subject liquid may contain as component (b) e.g. propyl acetates and/or one or more propylene glycol ethers selected among propylene glycol monomethyl ether, propylene glycol monoethyl ether, dipropylene glycol monomethyl ether and tripropylene glycol monomethyl ether. The diluent (c) may e.g. be butyl diglycol ether, ethyl diglycol ether or methyl diglycol ether, or it may be one or more aliphatic hydrocarbons. The type and amount of the diluent are selected in view of the flash point of the mixture, which must not be below 22° C. Preferably, the flash point should be above 55° C.

Moreover, the subject liquid may contain a surfactant, in particular a non-ionic surfactant (d), preferably in the form of a nonylphenol ethoxylate.

As mentioned, the subject liquids may be used for all types of cleaning tasks in the screen printing and printing field. In the screen printing field, the liquids are particularly used for cleaning frames, but also during the actual printing process. In offset, the liquids may be used for cleaning old dried-up ink residues and for cleaning machine parts, rollers, plates, etc.

As mentioned, component (a) may constitute up to 25% of the mixture. Components (c) and (d) together may constitute up to 50% of the mixture. Otherwise, the mixture may be composed within rather wide limits with respect to the specific field of use.

The invention will be illustrated more fully by the following examples.

EXAMPLE 1

In this example possible solvents for the printing ink "Thermojet Hvid" are selected on the basis of solubility tests and Hansen parameters. The ability of the selected solvents to dissolve the ink is evaluated subjectively, the solubility tests being performed in test tubes in which the ink is in contact with an excess of the liquids in question. The evaluation is made after 10 minutes and after 24 hours.

The results obtained are listed in the following table 1, from which it i.a. appears that some of the solvents require long-term exposure before they are active.

TABLE 1

Solubility range for "Thermojet Hvid"
$\delta_D = 18.77$  $\delta_P = 11.55$  $\delta_H = 7.81$  $R_P = 9.76$

| Solvent | $\delta_D$ | $\delta_P$ | $\delta_H$ | Solubility 10 min. | 24 hours |
|---|---|---|---|---|---|
| Acetone | 15.50 | 10.40 | 7.00 | yes[a] | — |
| Acetophenone | 19.60 | 8.60 | 3.70 | no[b] | yes |
| 1,3-butane diol | 16.60 | 10.00 | 21.50 | no | no |
| Butyl acetate | 15.80 | 3.70 | 6.30 | no | yes[a] |
| γ-butyrolactone | 19.00 | 16.60 | 7.40 | yes | — |
| Carbontetrachloride | 17.80 | 0.00 | 0.60 | no | no |
| Chlorobenzene | 19.00 | 4.30 | 2.00 | yes[a] | — |
| Chloroform | 17.80 | 3.10 | 5.70 | yes | — |
| Cyclohexanol | 17.40 | 4.10 | 13.50 | no | no[b] |
| Diacetone alcohol | 15.80 | 8.20 | 10.80 | no[b] | yes |
| o-dichlorobenzene | 19.20 | 6.30 | 3.30 | no[b] | yes |
| Diethylene glycol | 16.20 | 14.70 | 20.50 | no | yes[a] |
| Diethyl ether | 14.50 | 2.90 | 5.10 | no | no |
| Dimethyl formamide | 17.40 | 13.70 | 11.30 | yes[a] | — |
| Dimethyl sulfoxide | 18.40 | 16.40 | 10.20 | no | yes |
| 1,4-dioxane | 19.00 | 1.80 | 7.40 | no | yes[a] |
| Dipropylene glycol | 15.90 | 20.20 | 18.40 | no | no |
| Ethanol | 15.80 | 8.80 | 19.40 | no | no |
| Ethyl acetate | 15.80 | 5.30 | 7.20 | yes | — |
| Ethylene dichloride | 19.00 | 7.40 | 4.10 | yes | — |
| Ethylene glycol | 17.00 | 11.00 | 26.00 | no | no |
| Ethylene glycol monoethyl ether acetate | 15.90 | 4.70 | 10.60 | no | yes |
| Hexane | 14.90 | 0.00 | 0.00 | no | no |
| Isophorone | 16.90 | 8.20 | 7.40 | no[b] | yes |
| Methanol | 15.10 | 12.30 | 22.30 | no | no |
| Methylene chloride | 18.20 | 6.30 | 6.10 | yes | — |
| Methyl isobutyl ketone | 15.30 | 6.10 | 4.10 | no | yes |
| N—methyl-2-pyrrolidone | 18.00 | 12.30 | 7.20 | yes | — |
| Nitrobenzene | 20.00 | 8.60 | 4.10 | no | yes |
| 2-nitropropane | 16.20 | 12.10 | 4.10 | no | yes |
| Propylene carbonate | 20.00 | 18.00 | 4.10 | * | yes |
| Propylene glycol | 16.80 | 9.40 | 23.30 | no | no |
| Tetrahydrofuran | 16.80 | 5.70 | 8.00 | yes | — |
| Toluene | 18.00 | 1.40 | 2.00 | no | no |

TABLE 1-continued

Solubility range for "Thermojet Hvid"
$\delta_D = 18.77$  $\delta_P = 11.55$  $\delta_H = 7.81$  $R_P = 9.76$

| Solvent | $\delta_D$ | $\delta_P$ | $\delta_H$ | Solubility 10 min. | 24 hours |
|---|---|---|---|---|---|
| Trichloroethylene | 18.00 | 3.10 | 5.30 | yes | — |

*Not evaluated after 10 min.
[a]Ought to have been within the calculated ball
[b]Ought to have been outside the calculated ball

EXAMPLE 2

Like in example 1, possible solvents for the printing ink "Drugloss Blå" are selected on the basis of solubility tests and Hansen parameters.

The results obtained are listed in table 2:

TABLE 2

Solubility range for "Drugloss Bla"
$\delta_D = 17.54$  $\delta_P = 8.35$  $\delta_H = 7.33$  $R_P = 5.90$

| Solvent | $\delta_D$ | $\delta_P$ | $\delta_H$ | Solubility 10 min. | 24 hours |
|---|---|---|---|---|---|
| Acetone | 15.50 | 10.40 | 7.00 | yes | — |
| Acetophenone | 19.60 | 8.60 | 3.70 | yes | — |
| 1,3-butanediol | 16.60 | 10.00 | 21.50 | no | no |
| 1-butanol | 16.00 | 5.70 | 15.80 | no | no |
| Butyl acetate | 15.80 | 3.70 | 6.30 | yes[a] | — |
| γ-butyrolactone | 19.00 | 16.60 | 7.40 | yes | — |
| Carbontetrachloride | 17.80 | 0.00 | 0.60 | no | no |
| Chlorobenzene | 19.00 | 4.30 | 2.00 | yes[a] | — |
| Cyclohexanol | 17.40 | 4.10 | 13.50 | no | no |
| Diacetone alcohol | 15.80 | 8.20 | 10.80 | no[b] | yes |
| o-dichlorobenzene | 19.20 | 6.30 | 3.30 | no[b] | yes |
| Diethylene glycol | 16.20 | 14.70 | 20.50 | no | no |
| Diethyl ether | 14.50 | 2.90 | 5.10 | no | no |
| Dimethyl sulfoxide | 18.40 | 16.40 | 10.20 | no | yes |
| 1,4-dioxane | 19.00 | 1.80 | 7.40 | no | yes[a] |
| Dipropylene glycol | 15.90 | 20.20 | 18.40 | no | no |
| Ethanol | 15.80 | 8.80 | 19.40 | no | no |
| Ethyl acetate | 15.80 | 5.30 | 7.20 | yes | — |
| Ethylene dichloride | 19.00 | 7.40 | 4.10 | yes | — |
| Ethylene glycol | 17.00 | 11.00 | 26.00 | no | no |
| Ethylene glycol monoethyl ether acetate | 15.90 | 4.70 | 10.60 | yes | — |
| Hexane | 14.90 | 0.00 | 0.00 | no | no |
| Isophorone | 16.90 | 8.20 | 7.40 | no[b] | yes |
| Methanol | 15.10 | 12.30 | 22.30 | no | no |
| N—methyl-2-pyrrolidone | 18.00 | 12.30 | 7.20 | yes | — |
| Nitrobenzene | 20.00 | 8.60 | 4.10 | no | yes |
| 2-nitropropane | 16.20 | 12.10 | 4.10 | no[b] | yes |
| Propylene glycol | 16.80 | 9.40 | 23.30 | no | no |
| Toluene | 18.00 | 1.40 | 2.00 | no | yes[a] |
| Trichloroethylene | 18.00 | 3.10 | 5.30 | yes | — |

[a]Ought to have been within the calculated ball
[b]Ought to have been outside the calculated ball

EXAMPLE 3

Like in example 1, possible solvents for the printing ink "Color Jet" are selected on the basis of solubility tests and Hansen parameters.

The results obtained are listed in table 3:

TABLE 3

Solubility range for "Color Jet" (CO-113)
$\delta_D = 14.34$  $\delta_P = 7.45$  $\delta_H = 10.12$  $R_P = 12.75$

| Solvent | $\delta_D$ | $\delta_P$ | $\delta_H$ | Solubility 10 min. | 24 hours |
|---|---|---|---|---|---|
| Acetone | 15.50 | 10.40 | 7.00 | yes | — |
| Acetophenone | 19.60 | 8.60 | 3.70 | yes | — |
| 1,3-butane diol | 16.60 | 10.00 | 21.50 | no[b] | no[b] |
| 1-butanol | 16.00 | 5.70 | 15.80 | yes | — |
| Butyl acetate | 15.80 | 3.70 | 6.30 | yes | — |
| γ-butyrolactone | 19.00 | 16.60 | 7.40 | no | no |
| Carbontetrachloride | 17.80 | 0.00 | 0.60 | yes[a] | — |

TABLE 3-continued

Solubility range for "Color Jet" (CO-113)
$\delta_D = 14.34 \quad \delta_P = 7.45 \quad \delta_H = 10.12 \quad R_P = 12.75$

| Solvent | $\delta_D$ | $\delta_P$ | $\delta_H$ | Solubility 10 min. | 24 hours |
|---|---|---|---|---|---|
| Chlorobenzene | 19.00 | 4.30 | 2.00 | yes[a] | — |
| Chloroform | 17.80 | 3.10 | 5.70 | yes | — |
| Cyclohexanol | 17.40 | 4.10 | 13.50 | no[b] | no[b] |
| Diacetone alcohol | 15.80 | 8.20 | 10.80 | yes | — |
| o-dichlorobenzene | 19.20 | 6.30 | 3.30 | yes | — |
| Diethylene glycol | 16.20 | 14.70 | 20.50 | yes[a] | — |
| Diethylene glycol monobutyl ether | 16.00 | 7.00 | 10.60 | yes | — |
| Diethyl ether | 14.50 | 2.90 | 5.10 | yes | — |
| Dimemethyl formamide | 17.40 | 13.70 | 11.30 | yes | — |
| Dimethyl phthalate | 18.60 | 10.80 | 4.90 | yes | — |
| Dimethyl sulfoxide | 18.40 | 16.40 | 10.20 | no[b] | no[b] |
| 1,4-dioxane | 19.00 | 1.80 | 7.40 | yes | — |
| Dipropylene glycol | 15.90 | 20.20 | 18.40 | no | no |
| Dipropylene glycol methyl ether | 15.50 | 5.70 | 11.20 | yes | — |
| Ethanol | 15.80 | 8.80 | 19.40 | yes | — |
| Ethyl acetate | 15.80 | 5.30 | 7.20 | yes | — |
| Ethylene dichloride | 19.00 | 7.40 | 4.10 | yes | — |
| Ethylene glycol monoethyl ether acetate | 15.90 | 4.70 | 10.60 | yes | — |
| Hexane | 14.90 | 0.00 | 0.00 | no[b] | no[b] |
| Isophorone | 16.90 | 8.20 | 7.40 | yes | — |
| Methanol | 15.10 | 12.30 | 22.30 | yes[a] | — |
| Methylene chloride | 18.20 | 6.30 | 6.10 | yes | — |
| N—methyl-2-pyrrolidone | 18.00 | 12.30 | 7.20 | yes | — |
| Nitrobenzene | 20.00 | 8.60 | 4.10 | yes[a] | — |
| 2-nitropropane | 16.20 | 12.10 | 4.10 | yes | — |
| Propylene carbonate | 20.00 | 18.00 | 4.10 | no | no |
| Propylene glycol monomethyl ether | 15.60 | 6.30 | 11.60 | yes | — |
| Tetrahydrofuran | 16.80 | 5.70 | 8.00 | yes | — |
| Toluene | 18.00 | 1.40 | 2.00 | yes | — |
| Trichloroethylene | 18.00 | 3.10 | 5.30 | yes | — |

[a] Ought to have been within the calculated ball
[b] Ought to have been outside the calculated ball

EXAMPLE 4

Like in example 1, possible solvents for the printing ink "Seristar SX" are selected on the basis of solubility tests and Hansen parameters.

The results obtained are listed in table 4:

TABLE 4

Solubility range for Sericol red Seristar D2528
$\delta_D = 16.25 \quad \delta_P = 14.43 \quad \delta_H = 10.29 \quad R_P = 11.06$

| Solvent | $\delta_D$ | $\delta_P$ | $\delta_H$ | Solubility 10 min. | 24 hours |
|---|---|---|---|---|---|
| Acetone | 15.50 | 10.40 | 7.00 | yes | — |
| Acetophenone | 19.60 | 8.60 | 3.70 | yes[a] | — |
| 1,3-butane diol | 16.60 | 10.00 | 21.50 | no | no |
| 1-butanol | 16.00 | 5.70 | 15.80 | no | no |
| Butyl acetate | 15.80 | 3.70 | 6.30 | yes[a] | — |
| γ-butyrolactone | 19.00 | 16.60 | 7.40 | yes | — |
| Carbontetrachloride | 17.80 | 0.00 | 0.60 | no | no |
| Chlorobenzene | 19.00 | 4.30 | 2.00 | no | no |
| Chloroform | 17.80 | 3.10 | 5.70 | no | no |
| Cyclohexanol | 17.40 | 4.10 | 13.50 | no | no |
| Diacetone alcohol | 15.80 | 8.20 | 10.80 | yes | — |
| o-dichlorobenzene | 19.20 | 6.30 | 3.30 | no | no |
| Diethylene glycol | 16.20 | 14.70 | 20.50 | yes | — |
| Diethyl ether | 14.50 | 2.90 | 5.10 | no | no |
| Dimemethyl formamide | 17.40 | 13.70 | 11.30 | yes | — |
| Dimethyl phthalate | 18.60 | 10.80 | 4.90 | no | yes |
| Dimethyl sulfoxide | 18.40 | 16.40 | 10.20 | yes | — |
| 1,4-dioxane | 19.00 | 1.80 | 7.40 | no | no |
| Dipropylene glycol | 15.90 | 20.20 | 18.40 | no[b] | yes |
| Dipropylene glycol methyl ether | 15.50 | 5.70 | 11.20 | yes | — |
| Ethanol | 15.80 | 8.80 | 19.40 | yes | — |
| Ethyl acetate | 15.80 | 5.30 | 7.20 | yes | — |
| Ethylene dichloride | 19.00 | 7.40 | 4.10 | no[b] | no[b] |
| Hexane | 14.90 | 0.00 | 0.00 | yes | — |
| Isophorone | 16.90 | 8.20 | 7.40 | no | no |
| Methanol | 15.10 | 12.30 | 22.30 | yes[a] | — |
| Methylene chloride | 18.20 | 6.30 | 6.10 | yes | — |
| N—methyl-2-pyrrolidone | 18.00 | 12.30 | 7.20 | no | no |
| Nitrobenzene | 20.00 | 8.60 | 4.10 | yes[a] | — |
| 2-nitropropane | 16.20 | 12.10 | 4.10 | yes | — |
| Propylene carbonate | 20.00 | 18.00 | 4.10 | yes | yes |
| Propylene glycol monomethyl ether | 15.60 | 6.30 | 11.60 | yes | — |
| Tetrahydrofuran | 16.80 | 5.70 | 8.00 | yes | — |
| Toluene | 18.00 | 1.40 | 2.00 | no | no |
| Trichloroethylene | 18.00 | 3.10 | 5.30 | no | no |

[a] Ought to have been within the calculated ball
[b] Ought to have been outside the calculated ball

EXAMPLE 5

Like in example 1, possible solvents for the printing ink "Sericol MV 043" are selected on the basis of solubility tests and Hansen parameters.

The results obtained are listed in table 5:

TABLE 5

Solubility range for Sericol MV 043
$\delta_D = 17.55 \quad \delta_P = 10.30 \quad \delta_H = 7.26 \quad R_P = 6.93$

| Solvent | $\delta_D$ | $\delta_P$ | $\delta_H$ | Solubility 10 min. | 24 hours |
|---|---|---|---|---|---|
| Acetone | 15.50 | 10.40 | 7.00 | yes | — |
| Acetophenone | 19.60 | 8.60 | 3.70 | yes | — |
| 1,3-butane diol | 16.60 | 10.00 | 21.50 | no | no |
| 1-butanol | 16.00 | 5.70 | 15.80 | no | no |
| Butyl acetate | 15.80 | 3.70 | 6.30 | yes[a] | — |
| γ-butyrolactone | 19.00 | 16.60 | 7.40 | yes[a] | — |
| Carbontetrachloride | 17.80 | 0.00 | 0.60 | no | no |
| Chlorobenzene | 19.00 | 4.30 | 2.00 | no | no |
| Chloroform | 17.80 | 3.10 | 5.70 | yes[a] | — |
| Cyclohexanol | 17.40 | 4.10 | 13.50 | no | no |
| Diacetone alcohol | 15.80 | 8.20 | 10.80 | no[b] | no[b] |
| o-dichlorobenzene | 19.20 | 6.30 | 3.30 | no[b] | no[b] |
| Diethylene glycol | 16.20 | 14.70 | 20.50 | no | no |
| Diethyl ether | 14.50 | 2.90 | 5.10 | yes | — |
| Dimemethyl formamide | 17.40 | 13.70 | 11.30 | no | no |
| Dimethyl phthalate | 18.60 | 10.80 | 4.90 | no | yes |
| Dimethyl sulfoxide | 18.40 | 16.40 | 10.20 | yes | — |
| 1,4-dioxane | 19.00 | 1.80 | 7.40 | no | no |
| Dipropylene glycol | 15.90 | 20.20 | 18.40 | no | no |
| Dipropylene glycol methyl ether | 15.50 | 5.70 | 11.20 | no | no |
| Ethanol | 15.80 | 8.80 | 19.40 | no | no |
| Ethyl acetate | 15.80 | 5.30 | 7.20 | no[b] | yes |
| Ethylene dichloride | 19.00 | 7.40 | 4.10 | no[b] | yes |
| Hexane | 14.90 | 0.00 | 0.00 | yes | — |
| Isophorone | 16.90 | 8.20 | 7.40 | no | no |
| Methanol | 15.10 | 12.30 | 22.30 | yes | — |
| Methylene chloride | 18.20 | 6.30 | 6.10 | yes | — |
| N—methyl-2-pyrrolidone | 18.00 | 12.30 | 7.20 | yes | — |
| Nitrobenzene | 20.00 | 8.60 | 4.10 | yes | — |
| 2-nitropropane | 16.20 | 12.10 | 4.10 | no | no |
| Propylene carbonate | 20.00 | 18.00 | 4.10 | no | no |
| Propylene glycol monomethyl ether | 15.60 | 6.30 | 11.60 | no | no |
| Tetrahydrofuran | 16.80 | 5.70 | 8.00 | yes | — |
| Toluene | 18.00 | 1.40 | 2.00 | no | no |
| Trichloroethylene | 18.00 | 3.10 | 5.30 | no | no[b] |

[a] Ought to have been within the calculated ball
[b] Ought to have been outside the calculated ball

EXAMPLE 6

Like in example 1, possible solvents for the printing ink Sericol "Polyplast PY-043" are selected on the basis of solubility tests and Hansen parameters.

The results obtained are listed in table 6:

TABLE 6

Solubility range for Sericol "Polyplast PY-043"
$\delta_D = 19.37 \quad \delta_P = 8.73 \quad \delta_H = 5.91 \quad R_P = 8.74$

| Solvent | $\delta_D$ | $\delta_P$ | $\delta_H$ | Solubility 10 min. | 24 hours |
|---|---|---|---|---|---|
| Acetone | 15.50 | 10.40 | 7.00 | yes | — |
| Acetophenone | 19.60 | 8.60 | 3.70 | yes | — |
| 1,3-butane diol | 16.60 | 10.00 | 21.50 | no | no |
| 1-butanol | 16.00 | 5.70 | 15.80 | no | no |
| Butyl acetate | 15.80 | 3.70 | 6.30 | yes | — |
| γ-butyrolactone | 19.00 | 16.60 | 7.40 | yes | — |
| Carbontetrachloride | 17.80 | 0.00 | 0.60 | no | no |
| Chlorobenzene | 19.00 | 4.30 | 2.00 | yes | — |
| Chloroform | 17.80 | 3.10 | 5.70 | yes | — |
| Cyclohexanol | 17.40 | 4.10 | 13.50 | no | no[b] |
| Diacetone alcohol | 15.80 | 8.20 | 10.80 | no[b] | yes |
| o-dichlorobenzene | 19.20 | 6.30 | 3.30 | yes | — |
| Diethylene glycol | 16.20 | 14.70 | 20.50 | no | no |
| Diethyl ether | 14.50 | 2.90 | 5.10 | no | no |
| Dimemethyl formamide | 17.40 | 13.70 | 11.30 | yes | — |
| Dimethyl phthalate | 18.60 | 10.80 | 4.90 | no | yes |
| Dimethyl sulfoxide | 18.40 | 16.40 | 10.20 | yes[a] | — |
| 1,4-dioxane | 19.00 | 1.80 | 7.40 | yes | — |
| Dipropylene glycol | 15.90 | 20.20 | 18.40 | no | no |
| Dipropylene glycol methyl ether | 15.50 | 5.70 | 11.20 | no | no |
| Ethanol | 15.80 | 8.80 | 19.40 | no | no |
| Ethyl acetate | 15.80 | 5.30 | 7.20 | yes | — |
| Ethylene dichloride | 19.00 | 7.40 | 4.10 | yes | — |
| Ethylene glycol monoethyl ether acetate | 15.90 | 4.70 | 10.60 | yes | — |
| Hexane | 14.90 | 0.00 | 0.00 | no | no |
| Isophorone | 16.90 | 8.20 | 7.40 | no[b] | yes |
| Methanol | 15.10 | 12.30 | 22.30 | no | no |
| Methylene chloride | 18.20 | 6.30 | 6.10 | yes | — |
| N—methyl-2-pyrrolidone | 18.00 | 12.30 | 7.20 | yes | — |
| Nitrobenzene | 20.00 | 8.60 | 4.10 | yes | — |
| 2-nitropropane | 16.20 | 12.10 | 4.10 | yes | — |
| Propylene carbonate | 20.00 | 18.00 | 4.10 | no | yes |
| Propylene glycol monomethyl ether | 15.60 | 6.30 | 11.60 | no | no |
| Tetrahydrofuran | 16.80 | 5.70 | 8.00 | yes | — |
| Toluene | 18.00 | 1.40 | 2.00 | no | no |
| Trichloroethylene | 18.00 | 3.10 | 5.30 | yes | — |

[a] Ought to have been within the calculated ball
[b] Ought to have been outside the calculated ball It appears from the foregoing examples that there are several solvent candidates for each individual printing ink which are within the solubility range according to the Hansen model, but which are (a) not useful in practice because of current environmental requirements, (b) not useful in practice because of too slow dissolution effect, cf. the time parameter previously mentioned, or (c) have no effect on one or more of the ordinary printing inks.

EXAMPLE 7

This example shows that the solvent mixtures EX I A, EX I B, EX I C and EX 2 destroy the glue system more than the liquid mixtures O and V of the invention. It is moreover shown that a too large amount of γ-butyrolactone in the liquid mixtures of the invention (above 25%) destroys the glue system.

The commercial glue systems used were the following:

1. 10% hardener, as prescribed by the manufacturer
2. 10% hardener, as prescribed after 24 hours' hardening, coated with lacquer so that all the glue is covered.
3. 20% hardener, the frame having been pre-coated with a glue mixture which has hardened for 24 hours before mounting of the screen.

| Solvent mixtures | W/W % | |
|---|---|---|
| EX I A | 75.72 | N—methyl-2-pyrrolidone |
|  | 18.52 | Ethylene glycol monobutyl ether |
|  | 3.04 | Cyclohexanone |
|  | 2.72 | Synperonic NP 9 |
| EX I B | 47.12 | N—methyl-2-pyrrolidone |
|  | 47.12 | Ethylene glycol monobutyl ether |
|  | 3.04 | Cyclohexanone |
|  | 2.72 | Synperonic NP 9 |
| EX I C | 39.38 | N—methyl-2-pyrrolidone |
|  | 18.52 | Ethylene glycol monobutyl ether |
|  | 39.38 | Cyclohexanone |
|  | 2.72 | Synperonic NP 9 |
| EX 2 | 37.86 | N—methyl-2-pyrrolidone |
|  | 9.26 | Ethylene glycol monobutyl ether |
|  | 1.52 | Cyclohexanone |
|  | 24.00 | Ethylene glycol monoethyl ether acetate |
|  | 26.00 | Methylene chloride |
|  | 1.36 | Synperonic NP 9 |

Liquid mixture V of the invention with various amounts of γ-butyrolactone

|  | V W/W % | $V_C$ W/W % |
|---|---|---|
| Isoper L | 24.9 | 23.7 |
| DMP | 16.6 | 15.8 |
| MPA | 41.5 | 39.8 |
| γ-butyrolactone | 11.3 | 15.0 |
| Synperonic NP 9 | 5.9 | 5.7 |

A maximum of 15 W/W γ-butyrolactone may be added if a homogenous liquid is desired.

Liquid mixture V with various amounts of N—methyl-2-pyrrolidone

|  | $V_A$ W/W % | $V_D$ W/W % | $F_F$ W/W % |
|---|---|---|---|
| Isoper L | 24.9 | 22.29 | 20.79 |
| DMP | 16.6 | 14.86 | 13.86 |
| MPA | 41.5 | 37.15 | 34.65 |
| N—methyl-2-pyrrolidone | 11.3 | 20.0 | 25.0 |
| Synperonic NP 9 | 5.7 | 5.7 | 5.7 |

Liquid mixture V with various amounts of γ-butyrolactone and N—methyl-2-pyrrolidone

|  | $V_B$ W/W % | $V_E$ W/W % |
|---|---|---|
| Isoper L | 24.9 | 20.29 |
| DMP | 16.6 | 14.86 |
| MPA | 41.5 | 37.15 |
| γ-butyrolactone | 5.65 | 10.0 |
| N—methyl-2-pyrrolidone |  |  |
| Synperonic NP 9 | 5.7 | 5.7 |

Liquid mixture O with various amounts of γ-butyrolactone

|  | O W/W % | $O_I$ W/W % | $O_L$ W/W % |
|---|---|---|---|
| Isoper L | 9.7 | 8.95 | 8.37 |
| PMA | 14.6 | 13.48 | 12.61 |
| DB | 27.2 | 25.12 | 23.49 |
| DPM | 32.0 | 29.55 | 27.63 |
| γ-butyrolactone | 13.6 | 20.0 | 25.0 |
| Synperonic NP 9 | 2.9 | 2.9 | 2.9 |

Liquid mixture O with various amounts of N—methyl-2-pyrrolidone

-continued

|  | $O_G$ W/W % | $O_J$ W/W % | $O_M$ W/W % |
|---|---|---|---|
| Isoper L | 9.7 | 8.95 | 8.37 |
| PMA | 14.6 | 13.48 | 12.61 |
| DB | 27.2 | 25.12 | 23.49 |
| DPM | 32.0 | 29.55 | 27.63 |
| N—methyl-2-pyrrolidone | 13.6 | 20.0 | 25.0 |
| Synperonic NP 9 | 2.9 | 2.9 | 2.9 |

Liquid mixture O with various amounts of γ-butyrolactone and N—methyl-2-pyrrolidone

|  | $O_H$ W/W % | $O_K$ W/W % | $O_N$ W/W % |
|---|---|---|---|
| Isoper L | 9.7 | 8.95 | 8.37 |
| PMA | 14.6 | 13.48 | 12.61 |
| DB | 27.2 | 25.12 | 23.49 |
| DPM | 32.0 | 29.55 | 27.63 |
| γ-butyrolactone | 6.8 | 10.0 | 12.5 |
| N—methyl-2-pyrrolidone | 6.8 | 10.0 | 12.5 |
| Synperonic NP 9 | 2.9 | 2.9 | 2.9 |

Synperonic NP 9 = Surfactant.
Isoper L = Solvent, flash point 64° C.

| Glue system time (hours) | Test results 1. | | | 2. | | | 3. | | |
|---|---|---|---|---|---|---|---|---|---|
|  | 1.5 h | 2.5 h | 3.5 h | 1.5 h | 2.5 h | 3.5 h | 1.5 h | 2.5 h | 3.5 h |
| Pregan 240 E | 0 | 0 | 0-1 | −1-0 | −1-0 | 0 | 0 | 0 | 0-1 |
| V | 6 | 8-9 | 8 | 5 | 4 | 5 | 4 | 6-7 | 6 |
| $V_A$ 11.3% NM2P | 8 | 9 | 10-11 | 6 | 5 | 6-7 | 5-6 | 7-8 | 7-8 |
| $V_B$ 11.3% NM2P/BLO | 7-8 | 10 | 10 | 6 | 6 | 6 | 6 | 8 | 7-8 |
| $V_C$ 15% BLO | 6-7 | 11-12 | 12 | 7 | 10-11 | 11 | 6 | 8 | 7 |
| $V_D$ 20% NM2P | 13 | 13-14 | 14-15 | 11 | 13 | 10 | 9 | 12 | 12 |
| $V_E$ 20% NM2P/BLO | 7-8 | 13-14 | 12 | 9 | 12 | 10 | 10 | 10-11 | 12 |
| $V_F$ 25% NM2P | 13-14 | 13-14 | 12 | 14 | 14 | 11-12 | 12 | 12 |  |
| O 14% BLO | 4-5 | 7 | 6-7 | 2 | 3 | 5-6 | 4 | 5-6 | 4-5 |
| $O_G$ 14% NM2P | 3-4 | 8 | 6-7 | 2 | 4 | 5-6 | 4 | 6 | 4 5 |
| $O_H$ 14% NM2P/BLO 4-5 | 9 | 8 | 2 | 4 | 6-7 | 5 | 5 | 6 |  |
| $O_I$ 20% BLO | 6 | 8 | 11-12 | 4-5 | 4 | 6-7 | 4 | 5-6 | 5-6 |
| $O_J$ NM2P | 8 | 9 | 11 | 3 | 4-5 | 6 | 5 | 8-9 | 8-9 |
| $O_K$ NM2P/BLO | 7 | 8-9 | 11 | 3 | 4 | 7 | 5-6 | 8-9 | 7 |
| $O_L$ 25% BLO | 7 | 6 | 11 | 3 | 6 | 6 | 4-5 | 6 | 7 |
| $O_M$ 25% NM2P | 8-9 | 11 | 10 | 4-5 | 6 | 6 | 6-7 | 9 | 9-10 |
| $O_N$ 25% NM2P/BLO | 6-7 | 12 | 12 | 4-5 | 6 | 8 | 6 | 9 | 8 |
| EX I A | 11 | 14 | 15 | +* | * | * | 16* | * | 16 |
| EX I B | 12 | 14 | 15 | 9+ | 14 | 14 | 14 | 15 | 15 |
| EX I C | 13 | 13 | 14-15 | 13+ | 14-15 | * | 14 | 14-15 | 15 |
| EX 2 | 14 | 14 | 14 | 14+ | 14-15 | 15 | 14 | 15 | 15 |

+dissolves the lacquer
*falls off
the higher the figure, the more the glue system is destroyed.
14-15 inacceptable
V contains 11.3% γ-butyrolactone (BLO)
O contains 13.6% γ-butyrolactone
NM2P = N—methyl-2-pyrrolidone It appears from the results that EX I A, EX I B, EX I C and EX 2 destroy all three glue systems, and that destruction of the glue systems increases with increasing addition of γ-butyrolactone and N-methyl-2-pyrrolidone, respectively, to the liquid mixtures O and V of the invention.

We claim:

1. A liquid for removing printing and screen printing inks, characterized by consisting of an essentially anhydrous mixture comprising
    (a) γ-butyrolactone and/or N-methyl-2-pyrrolidone in an amount of 1-25% v/v) as well as
    (b) one or more propylene glycol derivatives selected from substituted propyl acetates of the formula

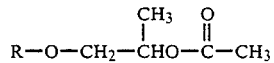

wherein R is hydrogen or alkyl having from 1 to 6 carbon atoms, and/or propylene glycol ethers of the formula

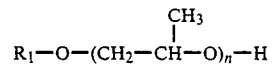

wherein $R_1$ is alkyl having from 1 to 6 carbon atoms, and n is 1, 2 or 3, and optionally
    (c) a diluent selected from aliphatic compounds having a flash point above 22° C. and a content of aromatic compounds below 1% and/or
    (d) a surfactant, the amount of components (b), (c) and (d) constituting 99-75% (v/v) of the liquid.
2. A liquid according to claim 1,
    characterized in that R is methyl or ethyl.
3. A liquid according to claim 1 or 2,
    characterized in that it contains as component (b) one or more propylene glycol ethers selected from propylene glycol monomethyl ether, propylene glycol monoethyl ether, dipropylene glycol monomethyl ether and tripropylene glycol monomethyl ether.
4. A liquid according to claim 3, characterized in that it contains as diluent one or more aliphatic hydrocarbons and/or an ether selected from butyl diglycol ether, ethyl diglycol ether and methyl diglycol ether.
5. A liquid according to claim 4, characterized in that it contains a surfactant.
6. A liquid according to claim 1,
    characterized in that it consists of 1-25% of component (a)

up to 99% of component (b)

and 0-91% of component (c), optionally containing component (d).

7. A liquid according to claim 1, characterized in that the amount of components (c) and (d) together constitutes up to 50% of the mixture.

8. A liquid according to claim 1 or 2, characterized in that it contains as diluent one or more aliphatic hydrocarbons and/or an ether selected from butyl diglycol ether, ethyl diglycol ether and methyl diglycol ether.

9. A liquid according to claim 3 characterized in that it contains a surfactant.

10. A liquid according to claim 9, characterized in that the surfactant is in the form of a nonyphenol ethoxylate.

11. A liquid according to claim 1 or 2 characterized in that it contains a surfactant.

12. A liquid according to claim 1, characterized in that it contains about 10% (v/v) of component (a).

13. A liquid according to claim 1, characterized in that it contains a surfactant in the form of a nonylphenol ethoxylate.

* * * * *